(12) United States Patent
Kang et al.

(10) Patent No.: US 6,390,139 B1
(45) Date of Patent: May 21, 2002

(54) CONDUIT PIPE FOR TELECOMMUNICATION CABLE

(75) Inventors: Young-Sug Kang, Daejeon; Geu-Bok Kim, Busan; Yong-Kun Noh, Daejeon; Myung-Woo Seo, Daejeon; Jeong-Kwen Park, Daejeon, all of (KR)

(73) Assignee: Korea Telecom, Gyeonggi-do (KR)

( * ) Notice: Subject to any disclaimer, the term of this patent is extended or adjusted under 35 U.S.C. 154(b) by 0 days.

(21) Appl. No.: 09/778,750

(22) Filed: Feb. 8, 2001

(30) Foreign Application Priority Data

Dec. 1, 2000 (KR) .............................. 00-72391

(51) Int. Cl.[7] ................................. F16L 11/04
(52) U.S. Cl. .................. 138/120; 138/155; 138/162; 138/166; 138/168
(58) Field of Search ................ 138/162, 155, 138/120, 166, 168, 105

(56) References Cited

U.S. PATENT DOCUMENTS

| | | | | |
|---|---|---|---|---|
| 1,995,716 A | * | 3/1935 | Millsom | 138/105 |
| 3,517,702 A | * | 6/1970 | Mueller et al. | 138/166 |
| 3,624,270 A | * | 11/1971 | Turner | 174/87 |
| 3,757,031 A | * | 9/1973 | Izraeli | 138/155 |
| 4,219,693 A | * | 8/1980 | French | 174/135 |
| 4,366,011 A | * | 12/1982 | Nolf | 138/168 |
| 4,426,108 A | * | 1/1984 | Kesselman | 174/92 |
| 4,535,197 A | * | 8/1985 | Butler | 138/168 |
| 4,865,890 A | * | 9/1989 | Erlichman | 138/166 |
| 5,134,250 A | * | 7/1992 | Caveney et al. | 138/166 |
| 5,722,702 A | | 3/1998 | Washburn | |
| 5,836,367 A | * | 11/1998 | Calabrese | 138/165 |

* cited by examiner

*Primary Examiner*—James Hook
(74) *Attorney, Agent, or Firm*—Pennie & Edmonds LLP

(57) ABSTRACT

A conduit pipe is installed within a cable tunnel and telecommunication cables are disposed in the conduit pipe. The conduit pipe is divided longitudinally into a plurality of divided bodies. Each divided body is equipped at one longitudinal side with a retaining part and at the other longitudinal side with a protruded part. A single conduit pipe is formed when the divided bodies are connected to each other along the longitudinal side. Since the divided bodies can be wound around a small-diameter bobbin to be carried, the space for their custody is reduced and the carriage thereof is easier. Further, since connection parts on surfaces of the conduit pipes can be arranged such that they occupy empty spaces between conduit pipes, the space occupied by the connection parts can be minimized, thereby comparatively larger number of telecommunication cables being able to be disposed within the cable tunnel.

14 Claims, 5 Drawing Sheets

CONDUIT PIPE FOR TELECOMMUNICATION CABLE

FIELD OF THE INVENTION

The present invention relates to a conduit pipe for a telecommunication cable; and, more particularly, to a conduit pipe which is divided longitudinally into a plurality of divided bodies for easy carriage and installation.

DESCRIPTION OF THE PRIOR ART

Conventionally a telecommunication cable is installed by taking following steps: forming manholes with a predetermined distance, burying an exterior pipe which is to function as a cable tunnel, installing a plurality of conduit pipes in the exterior pipe and arranging telecommunication cables within the conduit pipes.

FIG. 1 is a schematic drawing of a cable tunnel built by using a conventional method and FIG. 2 is a cross-sectional view of the cable tunnel with conventional conduit pipes installed therein. As shown in FIG. 1, manholes 1 and 1' are disposed tens or hundreds of meters apart from each other, and a typical distance between two adjacent manholes is 246 m. An exterior pipe 2 for building the cable tunnel is buried between the manholes 1 and 1'. A plurality of conduit pipes 3 are installed within the exterior pipe 2. As illustrated in FIG. 2, a telecommunication cable 4 is laid within the conduit pipe. The exterior pipe generally has a diameter big enough to accommodate some additional conduit pipes 3 in case an increase of telecommunication cables is needed later on.

Several types of PVC pipe such as foam conduit pipe have been utilized to form the conduit pipe 3. The conduit pipe is formed by connecting a plurality of such PVC pipes whose lengths are approximately 6 m. However, since the conduit pipes having a length of 6 m cannot be put into the cable tunnel through an opening of a manhole, the entire numbers of conduit pipes that can be accommodated within the cable tunnel must be installed all together at the same time when the cable tunnel is built. Further, since the conduit pipes occupy a lot of space, it is difficult to carry a great number of pipes at a time. Still further, connection parts of the conduit pipe 3 have larger diameter than any other part thereof, thereby reducing the number of conduit pipes to be installed within the cable tunnel. As a result, the number of communication cables 4 that can be arranged within the conduit pipes 3 is decreased as well.

In the case of using a PE pipe instead of a PVC pipe as a conduit pipe, comparatively larger number of conduit pipes may be installed in a cable tunnel because the PE pipe has no connection part. However, the PE pipe generally has a diameter of 100 mm, and thus it is difficult to carry the PE pipes because the diameter of a bobbin becomes excessively enlarged when the PE pipes are wound.

THE SUMMARY OF THE INVENTION

It is, therefore, the object of the present invention to provide a conduit pipe offering an effective use of an inner space of a cable tunnel. The conduit pipe is made of soft materials and longitudinally divided into a plurality of divided bodies which are kept disconnected at the time of conveyance and then assembled at the time of installation.

In accordance with an aspect of the present invention, there is provided a conduit pipe a plurality of which are installed within a cable tunnel and within which telecommunication cables are built. The conduit pipe comprises a plurality of divided bodies to be connected to form a single conduit pipe, wherein each divided body is equipped at one longitudinal side with retaining parts and at the other longitudinal side with protruded parts.

BRIEF DESCRIPTION OF THE DRAWINGS

The above and other objects and features of the present invention will become apparent from the following description of a preferred embodiment given with reference to the accompanying drawings, in which.

DETAILED DESCRIPTION OF THE PREFERRED EMBODIMENT

The followings are descriptions of a preferred embodiment of the present invention with reference to the accompanying drawings.

Figure 1:
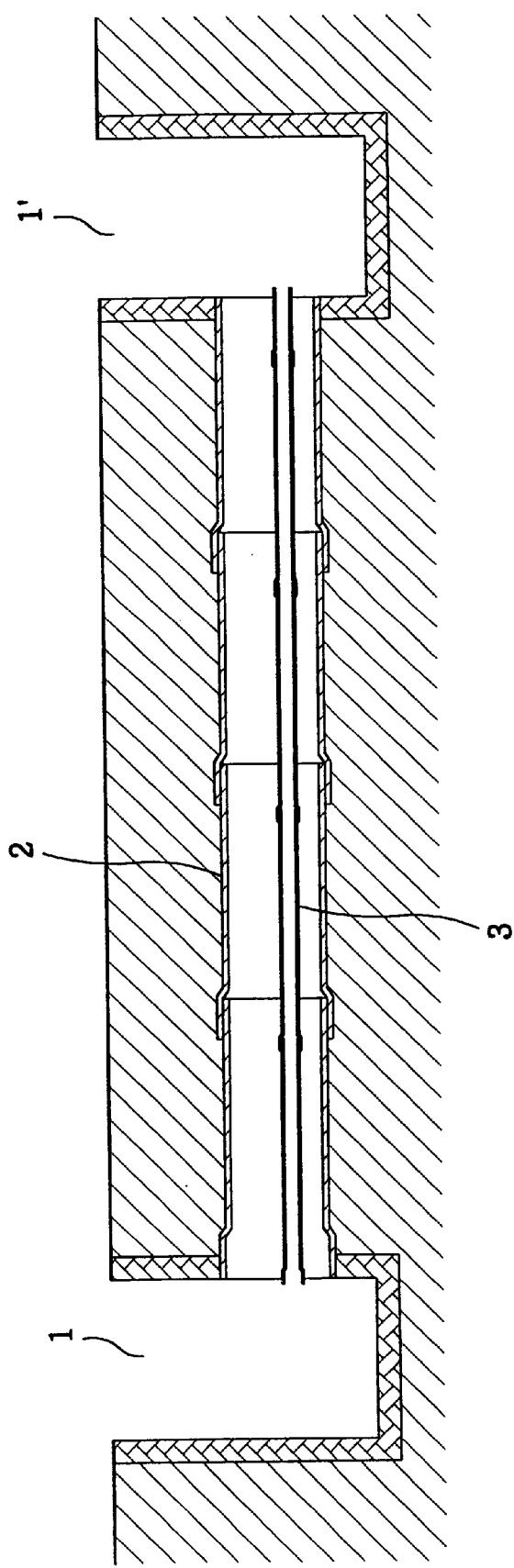
FIG. 1 is a schematic drawing showing a cable tunnel built by using a conventional method.
Figure 2:
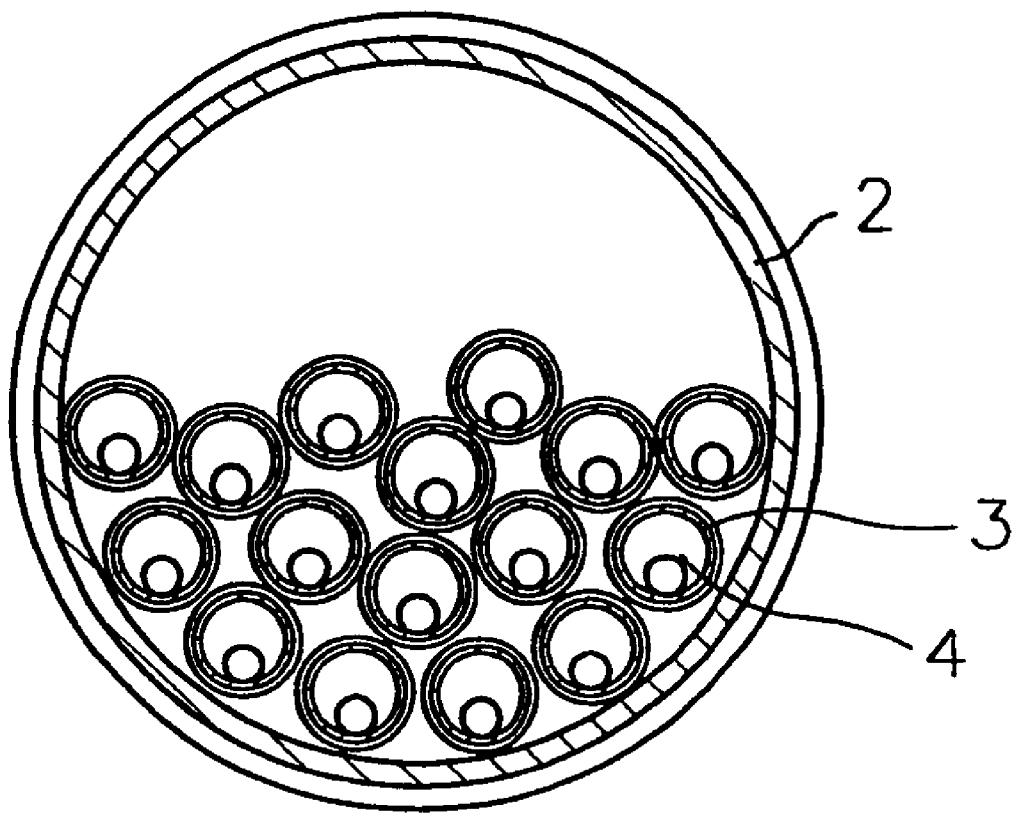
FIG. 2 provides a cross-sectional view of conventional conduit pipes installed within a cable tunnel.
Figure 3:
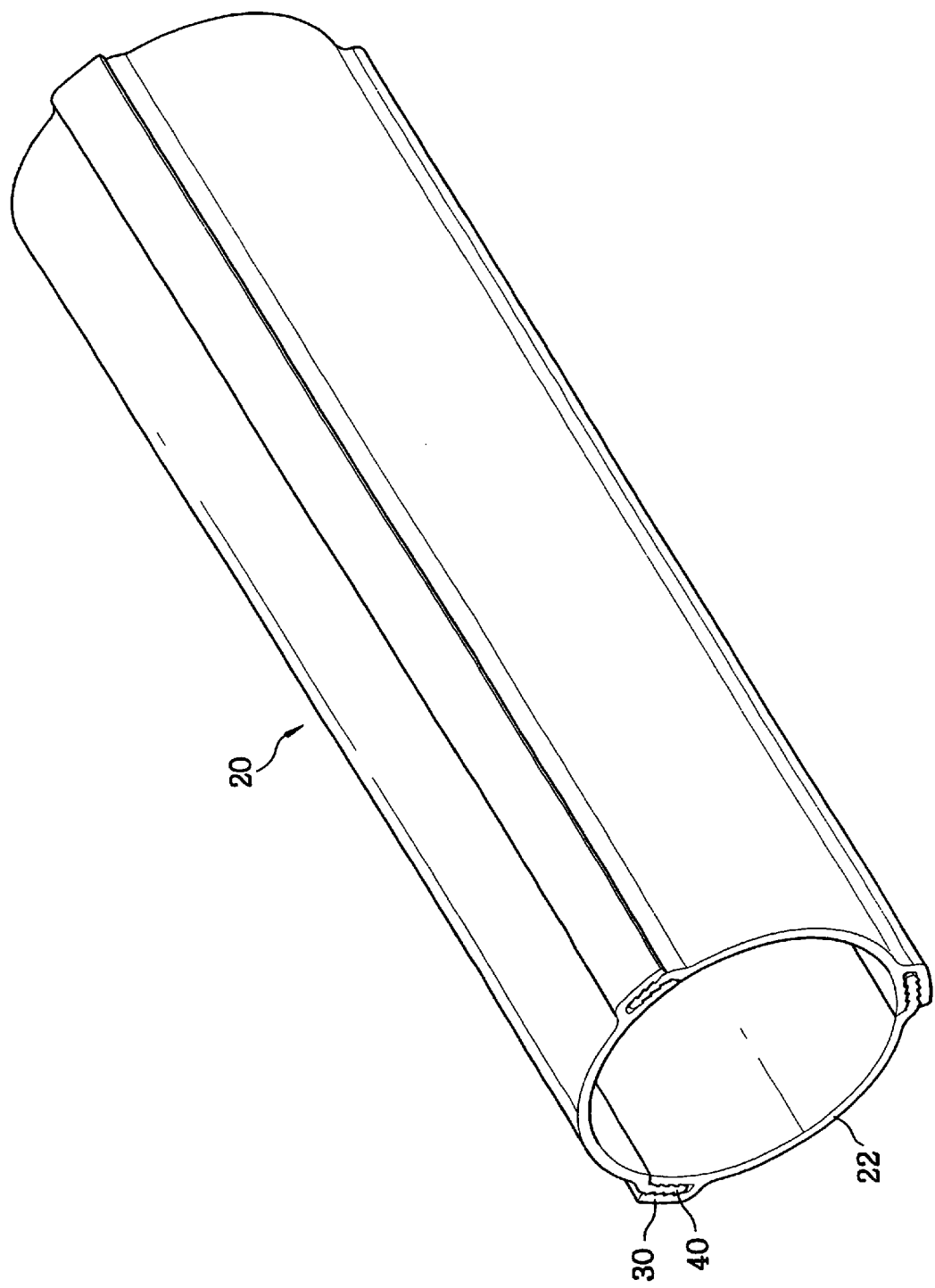
FIG. 3 sets forth a perspective view of a conduit pipe in accordance with the present invention.
Figure 4:
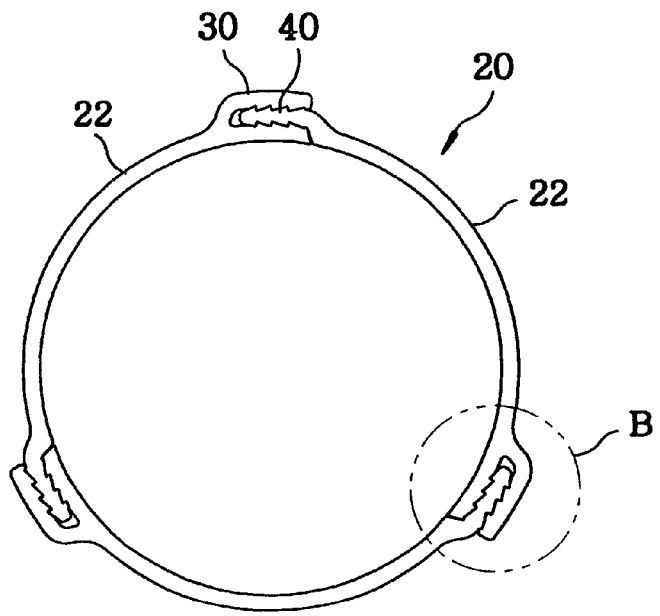
FIG. 4 describes an axial cross-sectional view of the conduit pipe in FIG. 3.
Figure 5:
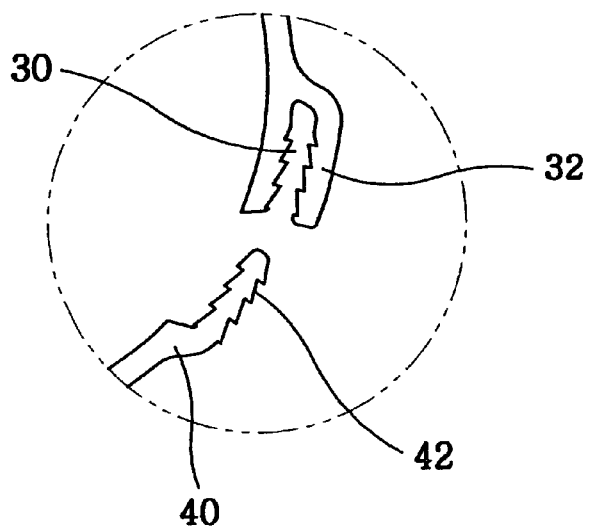
FIG. 5 depicts an enlarged view of part B in FIG. 4 showing a disengaged state thereof.
Figure 6:
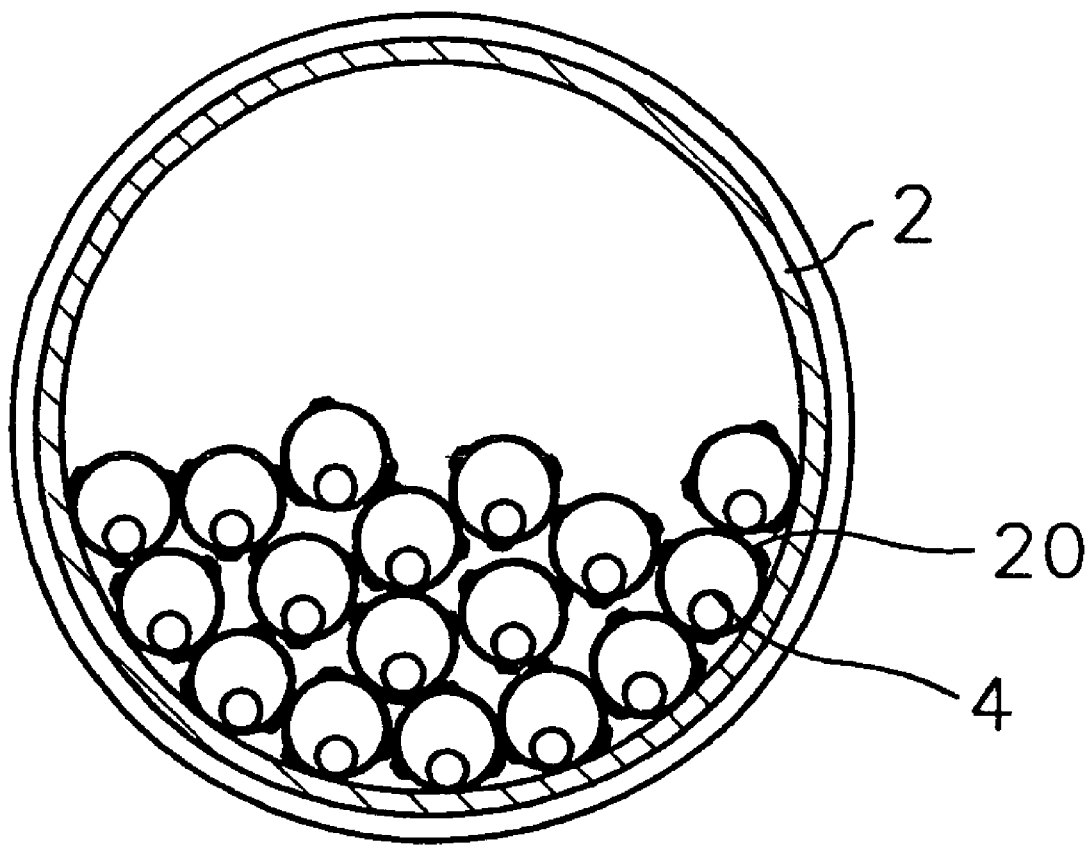
FIG. 6 is a cross-sectional view of the conduit pipes installed within a cable tunnel in accordance with the present invention.

FIG. 3 is a perspective view of a conduit pipe in accordance with the present invention and FIG. 4 represents an axial cross section of the conduit pipe of FIG. 3. FIG. 5 is an enlarged view of part B in FIG.4 and offers a disengaged state thereof. FIG. 6 is a cross-sectional view of conduit pipes of the present invention installed within a cable tunnel.

In accordance with the preferred embodiment of the present invention, a conduit pipe 20 comprises a plurality of divided bodies 22 that are made by dividing the conduit pipe 20 longitudinally. The divided bodies 22 have preferably the same length as a standard distance between manholes, e.g. 246 m. As shown in FIG. 3, the conduit pipe 20 is spilt into three divided bodies 22 which are angularly symmetrical to each other. Each divided body 22 has a retaining part 30 along one longitudinal side and a protruded part 40 along the other longitudinal side. The protruded part 40 is equipped with a saw-toothed protrusion 42, and the retaining part 30 is equipped with a saw-toothed groove 32 which engages with the saw-toothed protrusion 42 formed on the protruded part 40 of another divided bodies of the conduit pipe 20.

By configuring the conduit pipe as cited above, when a plurality of conduit pipes are arranged, connection parts, which are formed by engaging the protruded part of one divided body with the retaining part of another divided body and projected on the surface of conduit pipes, are arranged such that they occupy empty spaces between conduit pipes, thereby minimizing space occupied by the connection parts. The number of divided bodies of a conduit pipe may be varied depending on the materials used for manufacturing the divided bodies and the time required for installation thereof. Divided bodies may be angularly unsymmetrical to each other.

In accordance with the preferred embodiment of the present invention, a conduit pipe having a circular cross section is formed when three divided bodies 22 are connected. For establishing firm connection, it is preferable to construct connection parts of the divided bodies 22 by the above-described method. However, any configuration of the connection parts may be adopted if it can minimize the connection parts on the surfaces of the conduit pipes.

The divided bodies 22 are preferably made of polyethylene pipe. When soft materials are applied for constructing the conduit pipe, it becomes possible to wind the conduit pipe on a bobbin, thereby reducing the space needed for storage, which also makes it easier to install any additional conduit pipes within the exterior pipe even after the installation of an exterior pipe 10 is already completed.

A method for installing a conduit pipe of the present invention comprises following steps: the divided bodies 22 of the conduit pipe 20 are wound around a bobbin to be carried. At an installation site, the divided bodies 22 are unwound from the bobbin and connected to each other. The connection process can begin by fitting a protruded part 40 of a divided body 22 into a retaining part of another divided body 22 and making a saw-toothed protrusion 42 engage with a saw-toothed groove 32. Following these steps, three divided bodies 22 are jointed and a conduit pipe 20 having a circular cross section is formed. After the connection is established, the conduit pipe 20 is put into the exterior pipe 10 to be installed therein. Since the conduit pipe 20 is made of very soft materials, when the addition of the conduit pipe 20 is required even after the installation of the cable tunnel is completed, it is possible to assemble the conduit pipe 20 first and then insert it through the mouth of manholes 1 and 1' into the exterior pipe 10.

In the preferred embodiment of the present invention, connection parts of the conduit pipe 20 are arranged such that they occupy empty spaces between conduit pipes. Thus, the space occupied by connection parts of the conduit pipe is reduced, thereby enabling more conduit pipes to be installed within the exterior pipe 10 functioning as a cable tunnel. Further, since the conduit pipe 20 can be wound around a bobbin having a small diameter, the conduit pipe 20 can be easily carried and also doesn't need much space for storage. Accordingly, the costs involving storage and carriage can be lowered. Besides, all the conduit pipes 20 that can be accommodated within a cable tunnel need not be installed all at once when the cable tunnel is constructed. Any conduit pipe can be installed individually when additional installation is required, thus resulting in a cost-cut with regard to materials and construction.

While the present invention has been described with respect to the particular embodiments, it will be apparent to those skilled in the art that various changes and modifications may be made without departing from the spirit and scope of the invention as defined in the following claims.

What is claimed is:

1. A conduit pipe installed within a cable tunnel and having communication cables disposed therein, comprising a plurality of divided bodies to be connected to form the conduit pipe, each divided body including a retaining part at one longitudinal side and a protruded part at the other longitudinal side, wherein each divided body is made of a soft material such that each divided body is windable around a bobbin while being stored or carried and is flexible to such a degree that the conduit pipe formed by connecting the divided bodies is installable in the cable tunnel through a manhole.

2. The conduit pipe of claim 1, wherein the protruded part has a saw-toothed protrusion and the retaining part has a saw-toothed groove to be engaged with the saw-toothed protrusion.

3. The conduit pipe of claim 1, wherein the divided bodies are made of soft polyethylene.

4. The conduit pipe of claim 1, wherein the divided bodies are angularly symmetrical to each other.

5. The conduit pipe of claim 4, wherein the divided bodies are angularly symmetrical to each other with an opening angle of a degree of 120.

6. A conduit pipe assembly for a conduit pipe of the sort through which communication cables are carried underground between manhole covers, the conduit pipe assembly comprising:

at least three divided bodies connectable along longitudinal sides thereof, each divided body including a retaining part at one longitudinal side and a protruded part at the other longitudinal side;

wherein the divided bodies are adjustable between a disassembled state in which each divided body is wound on a bobbin, and an assembled state in which the divided bodies are assembled into said conduit pipe.

7. The conduit pipe assembly of claim 6, wherein the conduit pipe is formed from soft polyethylene.

8. The conduit pipe assembly of claim 6 in the assembled state, in combination with a plurality of communication cables accommodated in the conduit pipe.

9. The conduit pipe assembly of claim 8 in the assembled state, wherein the conduit pipe and the communication cables both extend for at least 246 meters.

10. The conduit pipe of claim 8 in the assembled state, wherein the conduit pipe and the communication cables both extend underground between two manholes.

11. A communication assembly comprising:

a conduit pipe assembly for a conduit pipe of the sort through which communication cables are carried underground between manhole covers, the conduit pipe assembly comprising:

at least three divided bodies connectable along longitudinal sides thereof, each divided body including a retaining part at one longitudinal side and a protruded part at the other longitudinal side;

wherein the divided bodies are adjustable between a disassembled state in which each divided body is wound on a bobbin, and an assembled state in which the divided bodies are assembled into said conduit pipe; and a plurality of communication cables accommodated within the conduit pipe, when the conduit pipe assembly is in the assembled state.

12. The communication assembly of claim 11, wherein the conduit pipe is formed from soft polyethylene.

13. The communication assembly of claim 11 with the conduit pipe assembly in the assembled state, wherein the conduit pipe and the communication cables extend between two manholes.

14. The communication assembly of claim 11 with the conduit pipe assembly in the assembled state, wherein the conduit pipe and the communication cables both extend for at least 246 meters.

* * * * *